US007088995B2

(12) United States Patent
Rao

(10) Patent No.: US 7,088,995 B2
(45) Date of Patent: Aug. 8, 2006

(54) COMMON SERVICE PLATFORM AND SOFTWARE

(75) Inventor: Herman Rao, Taipei (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 421 days.

(21) Appl. No.: 10/318,301

(22) Filed: Dec. 11, 2002

(65) Prior Publication Data
US 2003/0139174 A1 Jul. 24, 2003

Related U.S. Application Data

(60) Provisional application No. 60/341,171, filed on Dec. 13, 2001.

(51) Int. Cl.
*H04M 3/00* (2006.01)

(52) U.S. Cl. .................. 455/418; 455/419; 455/422.1; 455/410

(58) Field of Classification Search ............... 455/418, 455/419, 422.1, 426.1, 428, 432.1, 432.2, 455/433, 405, 406, 410
See application file for complete search history.

(56) References Cited

U.S. PATENT DOCUMENTS

| | | | | |
|---|---|---|---|---|
| 6,011,920 A | * | 1/2000 | Edwards et al. | ............. 717/130 |
| 6,510,417 B1 | * | 1/2003 | Woods et al. | ................ 704/275 |
| 2001/0056436 A1 | * | 12/2001 | Stejskal et al. | ............. 707/200 |
| 2002/0035579 A1 | * | 3/2002 | Wang et al. | ................. 707/513 |
| 2002/0193123 A1 | * | 12/2002 | Herzog et al. | .............. 455/456 |
| 2002/0198991 A1 | * | 12/2002 | Gopalakrishnan et al. | .. 709/225 |
| 2003/0043985 A1 | * | 3/2003 | Wu | ........................ 379/144.05 |
| 2004/0205613 A1 | * | 10/2004 | Li et al. | ...................... 715/523 |
| 2005/0004822 A1 | * | 1/2005 | Elgrably | ........................ 705/7 |

* cited by examiner

*Primary Examiner*—Joseph Feild
*Assistant Examiner*—Huy D. Nguyen
(74) *Attorney, Agent, or Firm*—Winston Hsu

(57) ABSTRACT

The invention advantageously provides a mobile common service platform and software in telecommunications systems. A common service platform (CSP) according to the invention is an integrated platform that supports both wireless and landline mobile services and business transactions. A CSP system according to the invention includes a common service platform or CSP for integrating a plurality of applications into a single platform for multiple uses in a plurality of communications systems. The CSP is connected with the plurality of applications and a plurality of users. Multiple users in different communications systems having varied communications protocols can utilize generally the same application (as selected by the users) through the CSP. Requests for uses in different communications system are transferred to the CSP for conversion into generally the same format that is acceptable by a selected application. Outputs from the selected application are transferred into formats that are acceptable by the requesting user. The CSP system advantageously enables a communications system to be quickly offered to market in conjunction with value-added services through applications rendered by third party service providers.

29 Claims, 9 Drawing Sheets

COMMON SERVICE PLATFORM AND SOFTWARE

RELATED APPLICATIONS

The present patent application relates to, and claims priority of, U.S. Provisional Patent Application Ser. No. 60/341,171 filed on Dec. 13, 2001, which is incorporated herein by reference in its entirety.

BACKGROUND OF THE INVENTION

1. Field of the Invention

The invention claimed in the present patent application generally relates to telecommunications and, more particularly, an optimal architecture for mobile common service platform and software in telecommunications systems.

2. Description of the Related Art

Mobile Internet access, that is, communications through mobile phones, pagers, desktop and palmtop computers, personal digital assistants (PDAs), and other hand-held electronic devices to the Internet, is increasingly important to society and commerce. The applications content available for private mobile Internet users currently include short message service (SMS), e-mail, news, weather, financial information, e-commerce (such as book ordering or investing services), and other services and information sources. Furthermore, mobile phones with built-in Global Positioning System (GPS) receivers can pinpoint the mobile device user's position so that proximate restaurant and navigation information services can be accessed. For commercial users, corporate intranets operating in conjunction with the Internet provide corporate information to employees in the field who can relay information back to headquarters. Wireless mobile Internet access is widespread in Japan and Scandinavia and demand is steadily increasing elsewhere. Efficient mobile Internet access and new applications can utilize the new high-transmission rate systems such as the General Packet Radio Service (GPRS), Enhanced Data Rates for GSM Evolution (EDGE), and the Third Generation Universal Mobile Telecommunications System (3G-UMTS) in conjunction with the presently available landline, fixed line networking, Global System for Mobile communications (GSM), code-division multiple access (CDMA), wireless application protocol (WAP) and other telecommunications systems.

As mobile Internet bandwidth increases, the number and variety of applications can also increase. A fundamental problem in communications networks is the so-called m*n complexity. That is, if there are m terminal devices and n applications service provider (ASP) servers, then the number of routes required for each terminal device to access an ASP server is m multiplied by n, which clearly results in an extremely complex system. ASP refers to a server side scripting language running under an Internet information server (IIS) for generating hypertext markup language or HTML. Conventional telecommunications operators currently can add applications and services only on an ad hoc basis requiring specific, distinct connectivity, interfaces, billing, authentication and data protocols for each new application. In other words, the conventional carrier is a dumb pipe, which merely transmits the signals and cannot assist the operator, application provider, or user.

A general need therefore exists in the art for an optimal architecture for mobile common service platform and software in telecommunications systems that advantageously overcomes at least the aforementioned and other shortcomings in the art. In particular, a need in the art exists for a telecommunications system that advantageously promotes standardized, open connectivity for service and applications providers in attracting and facilitating providers so that services will attract users.

Another need generally exists in the art for a relatively seamless integration of access methods using multiple types of devices and content hosts, i.e., convergence of mobile Internet applications, in providing a comprehensive information and service environment for users.

SUMMARY OF THE INVENTION

The invention advantageously provides a mobile common service platform and software in telecommunications systems. A common service platform (CSP) according to the invention is an integrated platform that supports both wireless and landline mobile services and business transactions. A CSP system according to the invention includes a common service platform or CSP for integrating a plurality of applications into a single platform for multiple uses in a plurality of communications systems. The CSP is connected with the plurality of applications and a plurality of users. Multiple users in different communications systems having varied communications protocols can utilize generally the same application (as selected by the users) through the CSP. Requests for uses in different communications system are transferred to the CSP for conversion into generally the same format that is acceptable by a selected application. Outputs from the selected application are transferred into formats that are acceptable by the requesting user. The CSP system advantageously enables a communications system to be quickly offered to market in conjunction with value-added services through applications rendered by third party service providers.

The invention further provides a software structure of a CSP system for integrating a plurality of applications into a single platform for multiple uses in a plurality of communications systems. A preferred embodiment of the software structure of a CSP system according to the invention primarily comprises a client layer having a plurality of client devices, a presentation and channel layer for providing presentation functions and communications channel management, a business logic layer providing applications (such as e-commerce applications), an infrastructure layer, a peripheral layer including a plurality of peripheral devices for the CSP system, and a universal layer for providing authentication, data security service and system management.

The invention, including at least the preferred and other embodiments described herein, accordingly provides an optimal architecture for mobile common service platform and software in telecommunications systems that advantageously overcomes at least the aforementioned and other shortcomings in the art, and more particularly, a telecommunications system that advantageously promotes standardized, open connectivity for service and applications providers in attracting and facilitating providers so that services will attract users. The invention advantageously provides seamless integration of access methods using multiple types of devices and content hosts, i.e., convergence of mobile Internet applications, in providing a comprehensive information and service environment for users. According to the invention, terminal devices, and particularly mobile phones, are advantageously provided with efficient and ready access to services and applications through the Internet and other networks, where mobile commerce ("m-commerce") is optimally achieved and realized. The virtuous cycle of a large installed base of users attracting applications providers with the number of users increasing because of the new applications is advantageously realized as well, where the convenience and efficiency of providing those applications to users are optimally implemented in accordance with the invention.

BRIEF DESCRIPTION OF THE DRAWINGS

The foregoing features and advantages of the invention will become more apparent in the following Detailed Description when read in conjunction with the accompanying drawings (not necessarily drawn to scale), in which.

DETAILED DESCRIPTION OF PREFERRED EMBODIMENTS

Figure 1:
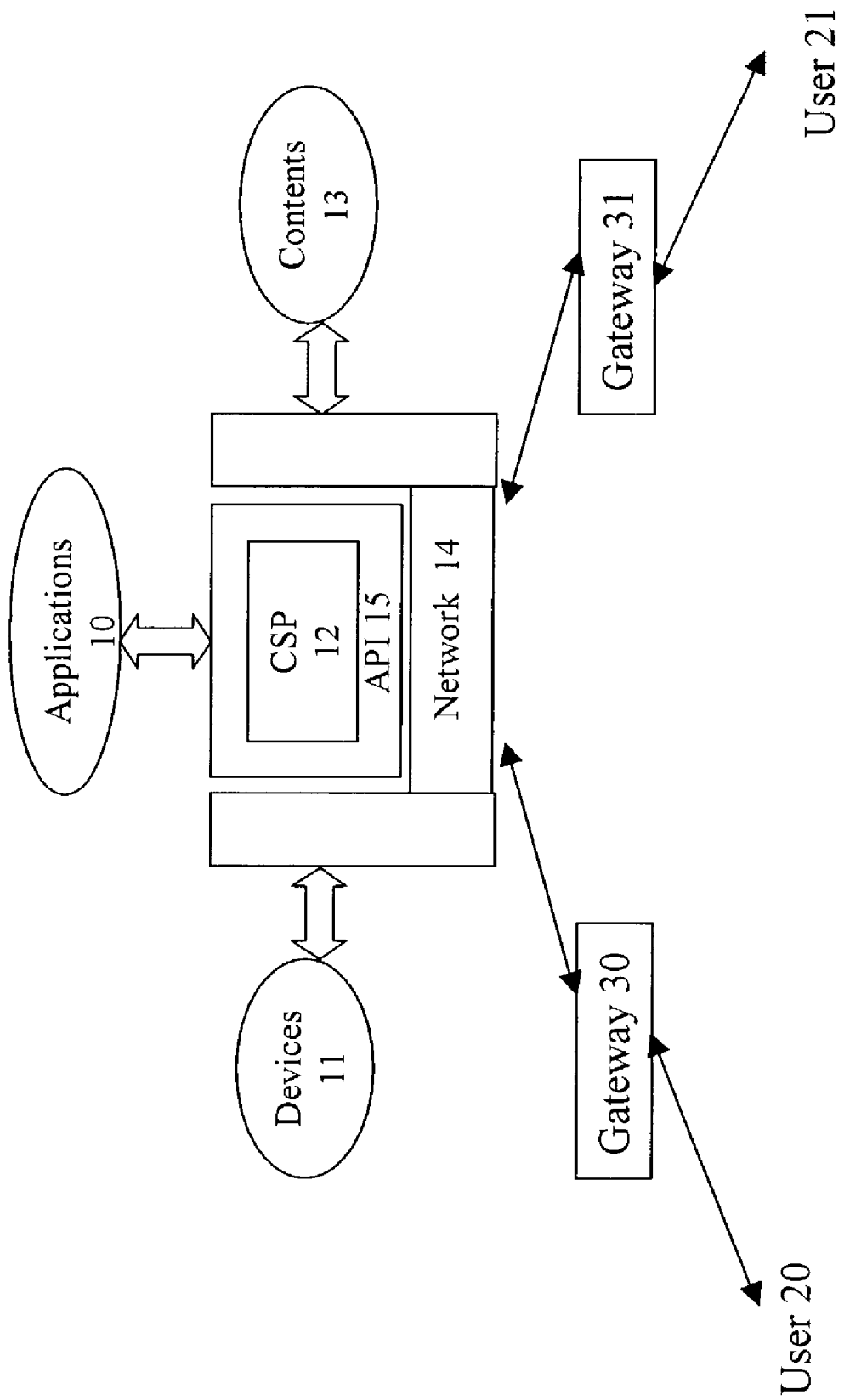
FIG. 1 is a block diagram generally illustrating an overview of a network architecture utilizing the common service platform (CSP) according to a general embodiment of the invention.

FIG. 1 is a block diagram that generally illustrates an overview of a network architecture utilizing the common service platform (CSP 12) according to a general embodiment of the invention. According to this particular embodiment of the invention, a network 14, CSP 12, a plurality of devices 11, applications 10 and content hosts 13 are provided. CSP 12 is connectible with, and at the nexus of, a plurality of applications 10, a plurality of terminal devices 11, and a plurality of content hosts 13. The CSP 12 is communicable with other users through a network 14. A plurality of application programming interfaces (APIs) 15 are provided in conjunction with the CSP 12 to shield the underlying network 14 by abstraction of the capabilities of network 14 and terminal devices 11, such as communications technology abstraction and content channeling. Furthermore, the end users 20 and 21 are communicable with the network 14 through the gateways 30 and 31, respectively. However, in the CSP system, the systems or devices of the end users may have protocols different from that used in the CSP. The gateways serve to convert the protocols in the users' devices into the protocols used in the network 14 so that the CSP 12 is communicable with the end users. Even though only one application is stored in the CSP, end users of systems or devices having different protocols can use the resource in the CSP system instead of preparing and implementing the same application having different protocols in their systems or devices. For the CSP system according to the invention, only one copy of application is necessary, which is stored in the CSP.

Figure 2:
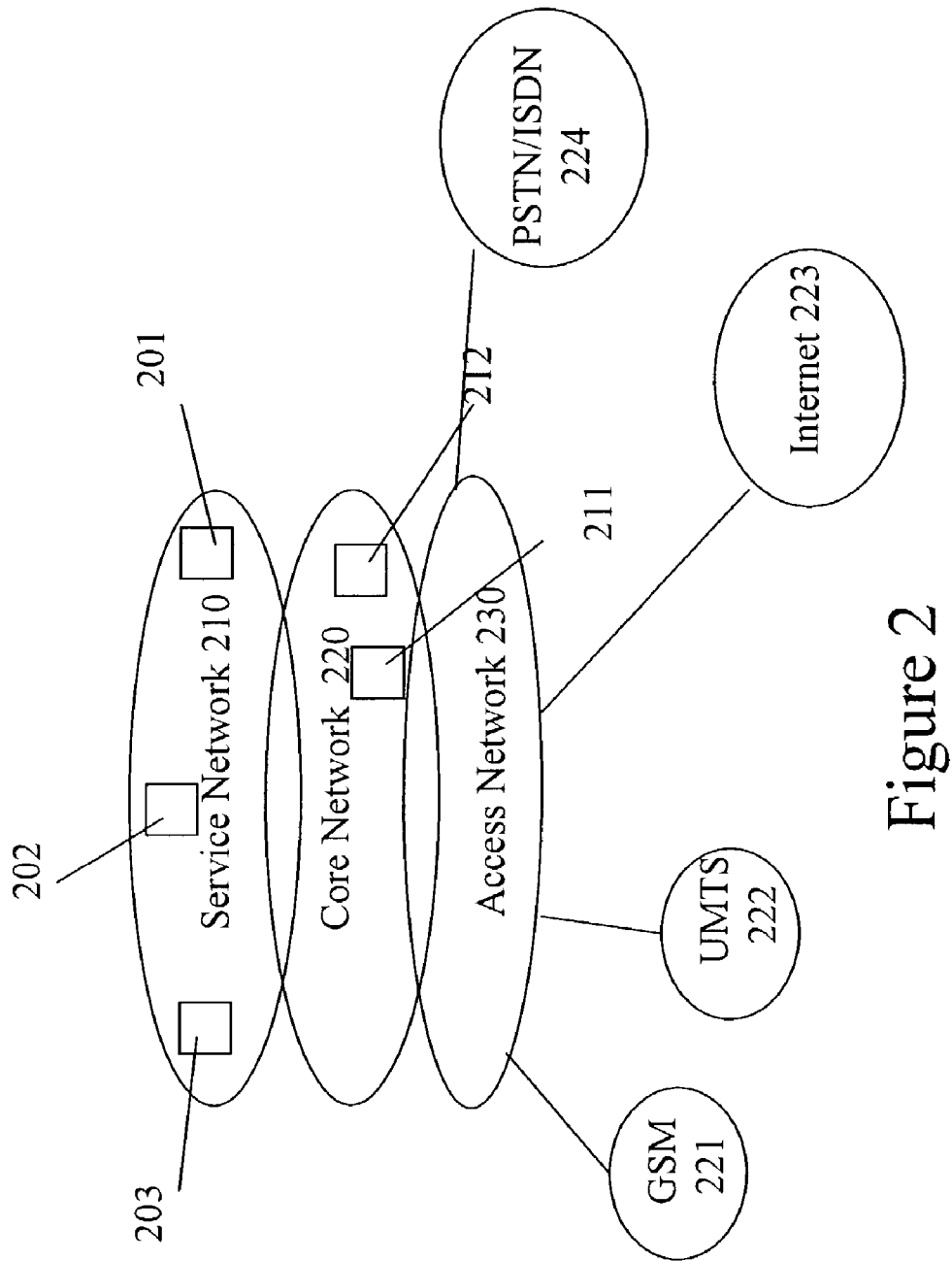
FIG. 2 is a block diagram generally illustrating a convergent network having a services network communicable with a plurality of application service providers (ASPs) according to another general embodiment of the invention.

FIG. 2 is a block diagram generally illustrating a convergent network 200 having a services network 210 communicable with a plurality of application service providers (ASPs) according to another general embodiment of the invention. According to this particular embodiment of the invention, the service network 210 having ASPs, core network 220 having home location registers (HLRs) 211 and visitor location registers (VLRs), and access network 230 are provided in the convergent network 200 that is communicable with GSM network 221, UMTS network 222, the Internet 223 and PSTN or ISDN 224.

ASPs 201, 202, 203, . . . are communicable with the service network 210 via landline or wireless communications. Immediately below the services network 220 is an operator's core network 220 comprising exemplary home location registers (HLRs) 211 and visitor location registers (VLRs, as used in wireless GSM) 212. The Home Location Registers (HLRs) contain a database comprising subscriber information, such as user profiles, current location and other administrative information. The Visitor Location Registers (VLRs) comprise a database containing location information of all of the mobile stations. Communicating with the core network 220 is an access network 230 that is communicable with GSM 221, UMTS 222, other telecommunications systems such as the Internet 223 or exemplary public switched telephone network (PSTN) or integrated services digital network (ISDN) 224.

Figure 3:
FIG. 3 is a block diagram generally illustrating an open system architecture (OSA) having a layered system for services and applications in a telecommunications system according to a preferred embodiment of the invention.

FIG. 3 is a block diagram that generally illustrates an open system architecture (OSA) having a layered system for services and applications in a telecommunications system according to a preferred embodiment of the invention. According to this particular embodiment of the invention, a service network having service/application layer 310, and core network 220 having a control layer 320 and connectivity layer 330 are provided. An exemplary services network 210 (such as network 210 of FIG. 2) comprises a services/applications layer 310, which is a platform for Internet protocol (IP) applications of all kinds. The services/applications layer is communicable with the core network 220 through various communications protocols provided by the telecommunications operator or provider. Each computer or device node or terminal device over the Internet includes a unique 32-bit IP address.

Through a variety of communications protocols, the services or applications layer 310 is communicable with an exemplary core network 220 (such as network 220 of FIG. 2), which comprises a control layer 320 that provides call control, session management, mobility management for terminal devices. The core network 220 further comprises a connectivity layer 330 that provides user data handling such as transport, switching, and routing user data.

The unified connectivity mechanism according to the invention (structurally illustrated as the connectivity layer 330 in FIG. 3) provides abstract channel access to, e.g., wireless application protocol (WAP) protocols in conjunctions such as WAP/GPRS, WAP/CSD (circuit switched data), unstructured supplementary service data (USSD), and through the Internet. Various gateways are also integrated with the common service platform (CSP) according to the invention through the connectivity layer 330, such as WAP GW, CGSN, and SMSC, where a variety of messaging services are advantageously provided. By separating the connectivity layer 330 from the applications logic, applications and service providers are shielded from the complexities of network interconnections. User profiles and single log-in capability allow customized access to all services and applications with a single log-in, where convenience and ease of use are advantageously provided to end users. The connectivity layer 330 according to the invention can also provide means for session management by the telecommunications carriers as needed and centralized control for the carriers, end users and service providers.

Further facilitating the convenience and ease of use for services and applications providers, a connectivity layer 330 according to a specific embodiment of the invention provides multiple service hosting located on a trusted domain (e.g., the proprietary systems of telecommunications carriers) or on an application domain (e.g., through an un-trusted access to the Internet). Further embodiments of the common service platform (CSP) according to the invention further include up-call, time-out, application write transaction log, acknowledgement (ACK to ensure service delivery), and error handling. In given embodiments of the invention, the unified access application programming interfaces for the connectivity layer 330 utilize universal resource locator (URL), extensible markup language (XML) or hypertext transport protocol (HTTP). An URL is a platform independent manner for specifying a file or resource over the Internet. XML is an international standard for handling random access ram (RAM) and data communications bandwidth for creating markup languages. HTTP is a protocol used by web browsers for transporting text and graphics over the Internet, where web pages are retrieved one at a time as opposed to set up a session connecting to the Internet.

Figure 4:
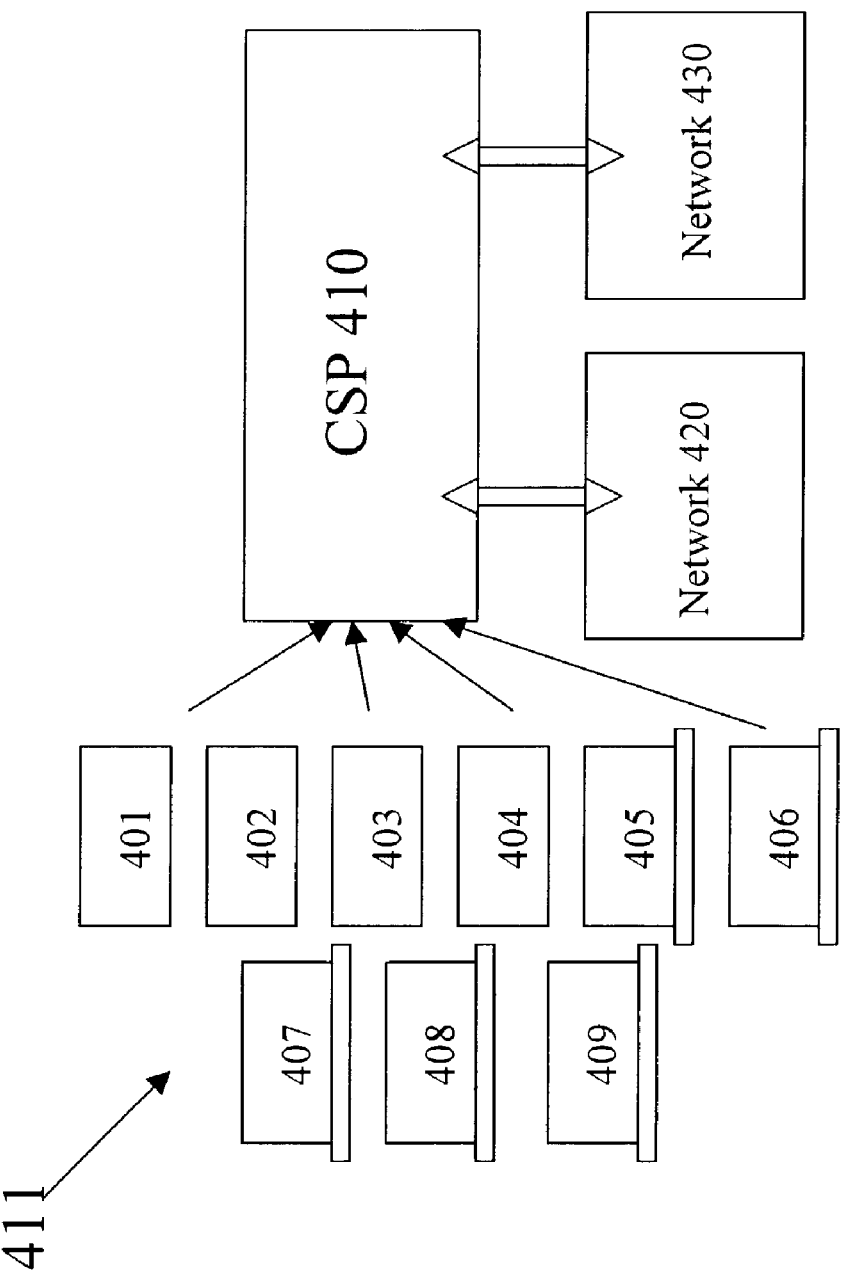
FIG. 4 is a block diagram generally illustrating a common service platform (CSP) according to another preferred embodiment of the invention.

FIG. 4 is a block diagram that generally illustrates a common service platform (CSP 410) according to another preferred embodiment of the invention. According to this particular embodiment of the invention, CSP 410, a plurality of terminal devices 411, a plurality of applications/service computers 412, network resources 420 and backend system 430 are provided. An exemplary common service platform (CSP 410) is communicable with a plurality of exemplary user terminal devices 411, including mobile phones 401, 402, 403 and 404, personal digital assistant (PDA) devices 405 and 406, pager device 407, handheld or pocket computer 408 and notebook computer 409. Also communicable with CSP 410 are a plurality of services or applications computers 412, such as servers. CSP 410 is further communicable with network resources 420 and a back end system 430 (e.g., accounting and data warehousing). CSP 410 further provides a standardized platform for ASP servers 412 to interface with, where the readily available provision of services and applications to user terminal devices 411 is advantageously optimal and efficient.

Figure 5:
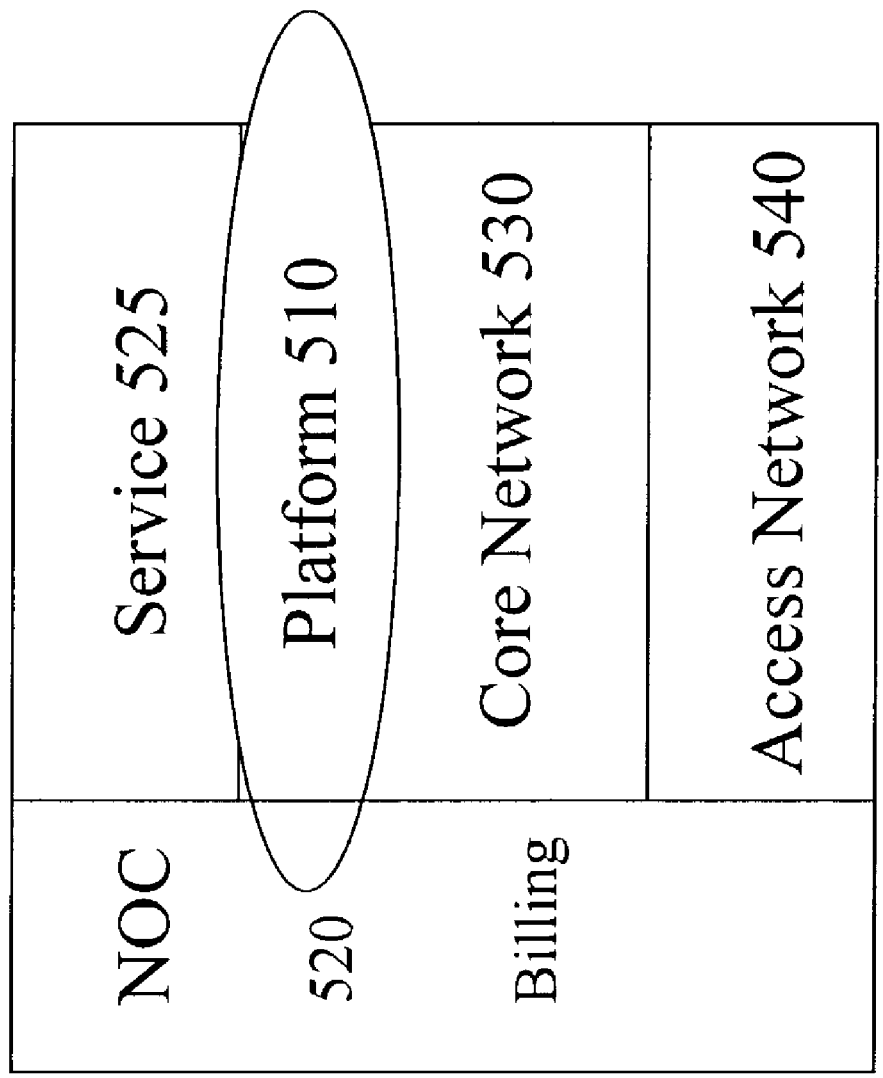
FIG. 5 is a block diagram generally illustrating another exemplary common service platform (CSP) with a network operations center (NOC) and billing system, services, core network and access network according to a further embodiment of the invention.

FIG. 5 is a block diagram that generally illustrates another exemplary common service platform (CSP 510) with a network operations center (NOC) for providing network control functions and billing system 520 for billing end users charges for the services provided by the CSP system, a plurality of services 525, a core network 530 as an underlying structure for communicating with outer environments, and an access network 540 according to a further embodiment of the invention. According to this particular embodiment of the invention, CSP 510, NOC 520, services 525, core network 530 and access network 540 are provided. CSP 510 advantageously provides device abstraction, where all terminal devices are accordingly treated as an abstract entity rather than different devices requiring different data and communications handling. With device abstraction, CSP 510 advantageously hides the complexity of the core network 530 and access network 540 from the service providers, and unified application programming interfaces for network resources and backend systems (such as networks 420 and 430, respectively, of FIG. 4).

The exemplary common service platform (CSP 510) according to the invention, advantageously separates the business logic from the applications logic and content sources in providing an efficient, standardized and convenient means for implementing new services and applications through telecommunications service providers to the end users. The invention as embodied in a common service platform (e.g., CSP 510) transforms the conventional dump pipe of telecommunications carriers into a so-called smart pipe in meeting the needs of new services and applications. The CSP 510 is advantageously data oriented, as opposed to the voice orientation of telephony systems in the art. Moreover, the invention advantageously provides an open system architecture, blue print and standardized applications programming interface for efficient and easy use by application service providers. With the common service platform according to the invention, content service providers and other third party service providers (such as business, equity markets, weather, sports, entertainment, retailing services) can advantageously focus on their applications and services rather on the intricacies of the interfaces with the telecommunications system, where time and resources are advantageously conserved for optimal services and applications design and delivery to end users. In operation, the common service platform (e.g., CSP 510) according to the invention acts as a unified connectivity mechanism for accessing and providing services using a built-in portal provided between the telecommunications network and the Internet. The CSP according to the invention further provides publicity display for services and applications providers with priority placement for menu display of terminal devices (which is described in further detail below). For business logic, the CSP according to the invention further includes revenue sharing for application service providers, telecommunications carriers, or other participating providers (e.g., advertisers and media). The CSP further provides interface and middleware for backend systems of billing and data warehouses (such as efficient user billing, and reverse billing to service providers). Accordingly, the business logic according to the invention advantageously provides a cohesive and synergistic basis for partnership encompassing service providers and telecommunications carriers.

A preferred embodiment of the revenue-sharing mechanism according to the invention (schematically illustrated as the billing system 520 of FIG. 5) utilizes micro-payments for applications and services use on a data-charging basis (as opposed to voice telephony duration charging). The common service platform (CSP 510) according to the invention generates charging information between third party service providers and telecommunications carriers. A billing record is generated, filtered by a mediation device to add any desired adjustments, and then transmitted for an accounting in payment settlement. A dynamically configurable matrix provides different pricing or revenue-sharing arrangements as desired.

Figure 6:
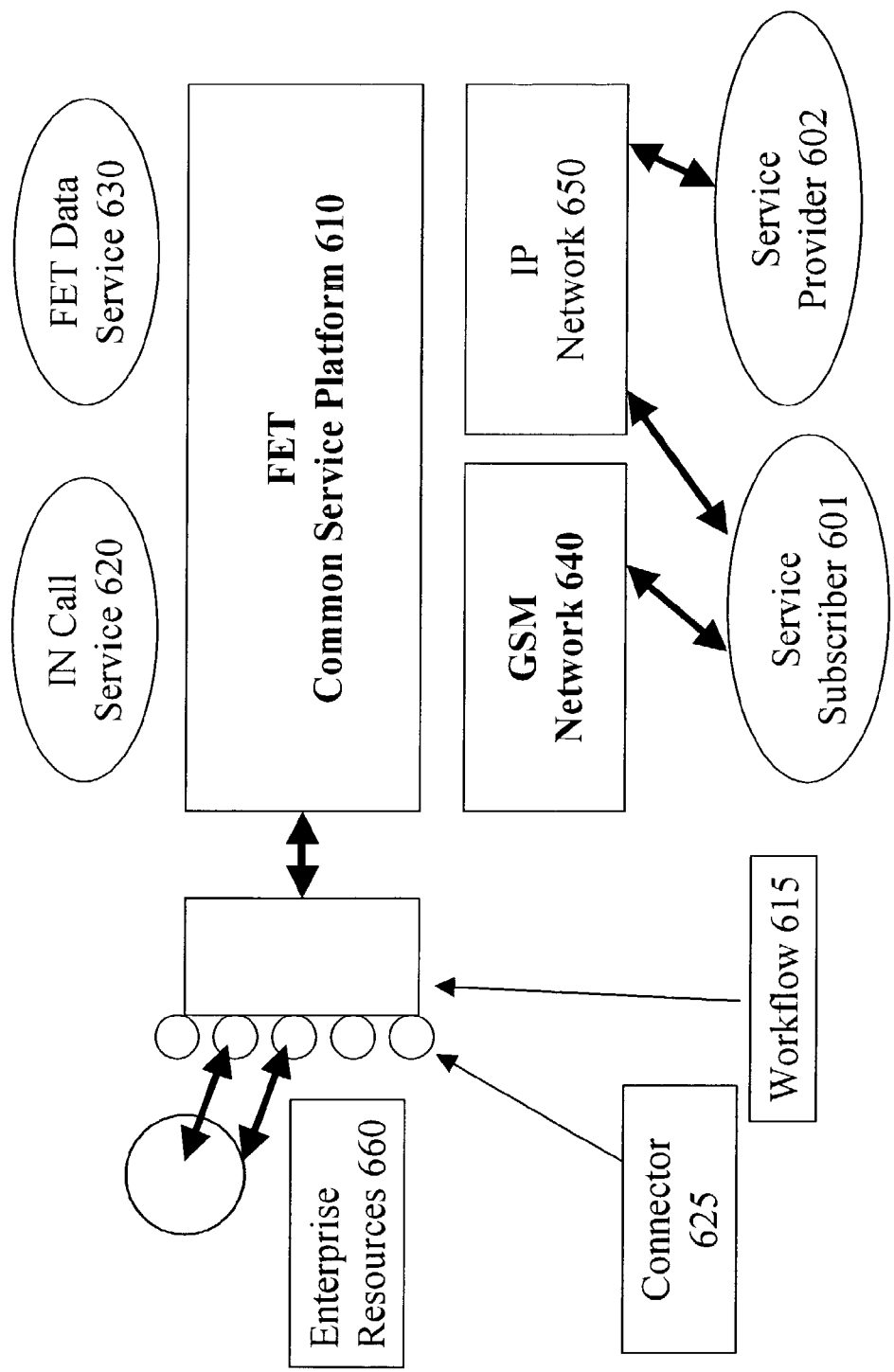
FIG. 6 is a block diagram schematically illustrating an exemplary relational service structure of a common service platform (CSP) according to another embodiment of the invention.

FIG. 6 is a block diagram that schematically illustrates an exemplary relational service structure of a common service platform (CSP 610) according to another embodiment of the invention. According to this particular embodiment of the invention, CSP 610, GSM network 640, IP network 650, telephony services 620, data services 630, service providers 602 for service subscribers 601, enterprise resources 660, connectors 625, and workflow device 615 are provided. CSP 610 is communicable with telephony services 620 and service provider 630 for data services. An exemplary GSM network 640 and Internet protocol (IP) network 650 are also communicable with the CSP 610. End users or service subscribers 601 access CSP 610 through their terminal devices (not shown), which are communicable with the GSM network 640 and IP network 650. The service providers 602 access CSP 610 through the IP network 650. The workflow device 615 is coupled to CSP 610 to serve as the connection to exemplary enterprise resources 660 through the connectors 625. Exemplary enterprise resources 660 comprise accounting, financial, resource management, and associated programs and devices.

Figure 7:
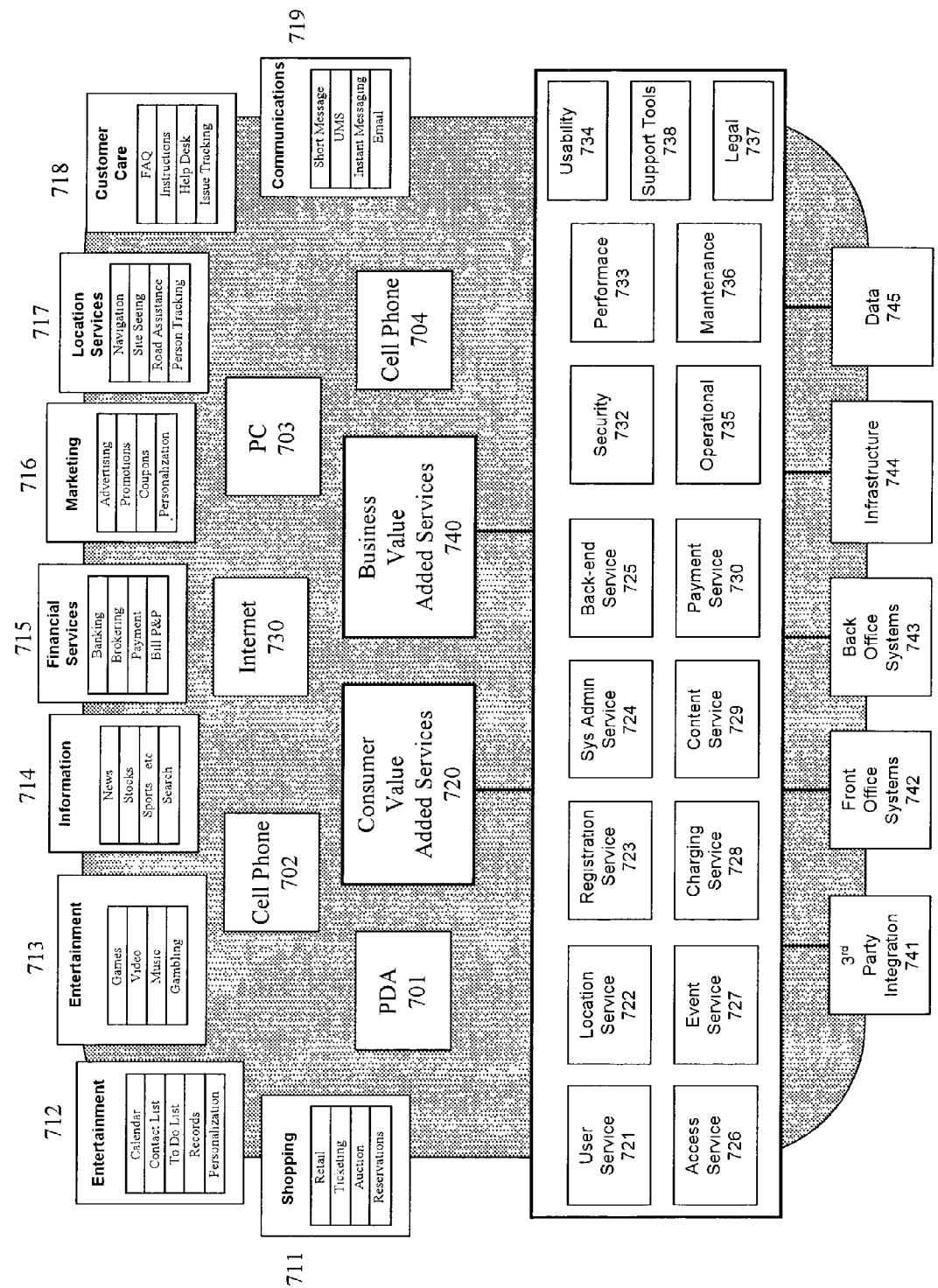
FIG. 7 is a block diagram schematically illustrating an exemplary architecture for a common service platform (CSP) according to a further preferred embodiment of the invention.

FIG. 7 is a block diagram that schematically illustrates an exemplary architecture for a common service platform (CSP 710) according to a further preferred embodiment of the invention. According to this particular embodiment of the invention, CSP 710, end user services 720, network 730, a plurality of terminal devices 701, 702, 703 and 704, business services 740, a plurality of services and applications 711, 712, 713, 714, 715, 716, 717, 718 and 719, a plurality of functional services 721, 722, 723, 724, 725, 726, 727, 728, 729 and 730, a plurality of functional capabilities 732, 733, 734, 735, 736, 737 and 738, third party integration 741, front office systems 742, back office systems 743, infrastructure 744, and data warehouses 745 are provided.

The common service platform (CSP 710) according to the invention advantageously provides the common platform for end user or consumer value-added services 720 through the Internet or another network 730 (such as a local area network or LAN, wide area network or WAN, and metropolitan area network or MAN) that is communicable with end users having terminal devices exemplified by personal digital assistant or PDA 701, mobile phone 702, personal computer or PC 703, and other handheld devices 704. Business value-added services 740, such as those with locators, standardized forms (e.g., insurance damage or inventory reports), selected business information, are also communicable with the common service platform (CSP 710) and network 730 to provide .business services to corporate end users. Exemplary applications and services according to the invention include, but not limited to, shopping 711 (e.g., retailing, ticket purchases, auctions, hotel and restaurant reservations), personal information management or PIM 712 (e.g., calendar, contact list, to do list, records or personalized data), entertainment 713 (e.g., games, video, music or gambling), information 714 (e.g., news, stocks, sports or search engines), financial services 715 (e.g., banking, brokering, bills or electronic payment), marketing 716 (e.g., advertising, promotions, coupons or customized items), location services 717 (e.g., navigation, sightseeing, road assistance or individual tracking), customer care 718 (e.g., frequently asked questions or FAQs, instructions, help desk or issue tracking), and communications 719 (e.g., short message service or SMS, unified message service or UMS, instant messaging or e-mails).

Further according to this particular embodiment of the invention, the common service platform (CSP 710) further comprises, among others, functional services and environmental capabilities. The functional services for CSP 710 exemplarily comprise services such as user services 721, location services 722, registration 723, system administration 724, back end services 725, access services 726, event services 727, charging services 728, content services 729, and payment services 731. The functional capabilities for CSP 710 exemplarily comprise capabilities such as security capabilities 732, performance capabilities 733, usability capabilities 734, operational capabilities 735, maintenance capabilities 736, legal capabilities 737, and support tools 738. Communicable at the other side of common service platform or CSP 710 are third party integrations 741, front office systems 742, back office systems 743, infrastructure 744, and data warehouses 745.

The invention advantageously combines known objects (integration of legacy systems) through a communications structure (such as a connectivity layer) by coupling them to a telecommunications network, where the known objects are efficiently distributed to end users of the network. Using a layered architecture, the complexity of myriad services and applications delivered to and received by a multitude of users by a plethora of service providers is overcome in an efficient and optimal manner, which further provides capability for management and billing efficiency and convenience. Simplicity, efficiency, and facility of use are advantageously achieved by a defined, standardized architecture using a plurality of readily available modules and interfaces. The modules and interfaces are re-useable for different services and applications, but also can be reformulated for specific applications as the need arises. For example, if a revenue-sharing billing percentage is changed to reflect new contractual agreements or changed market conditions, a simplistic change in the module utilizing a dynamically configurable matrix advantageously allows different percentages to be entered, where the changed module thereafter will provide the desired result.

The unified connectivity mechanism according to the invention (structurally illustrated as the connectivity layer 330 in FIG. 3) provides abstract channel access to, e.g., wireless application protocol (WAP) protocols in conjunctions such as WAP/GPRS, WAP/CSD (circuit switched data), unstructured supplementary service data (USSD), and through the Internet. Various gateways are also integrated with the common service platform (CSP) according to the invention through the connectivity layer 330, such as WAP GW, CGSN, and SMSC, where a variety of messaging services are advantageously provided. By separating the unified connectivity mechanism according to the invention from the applications logic, applications and service providers are shielded from the complexities of network interconnections. User profiles and single log-in capability allow customized access to all services and applications with a single log-in, where convenience and ease of use are advantageously provided to end users. The unified connectivity mechanism according to the invention can also provide means for session management by the telecommunications carriers as needed and centralized control for the carriers, end users and service providers. Further facilitating the convenience and ease of use for services and applications providers, a unified connectivity mechanism according to a specific embodiment of the invention provides multiple service hosting located on a trusted domain (e.g., the proprietary systems of telecommunications carriers) or on an application domain (e.g., through an un-trusted access to the Internet). Further embodiments of the common service platform (CSP) according to the invention further include up-call, time-out, application write transaction log, acknowledgement (ACK to ensure service delivery), and error handling. In given embodiments of the invention, the unified access application programming interfaces for the connectivity layer 330 utilize universal resource locator (URL), extensible markup language (XML) or hypertext transport protocol (HTTP).

A preferred embodiment of the revenue-sharing mechanism according to the invention (structurally illustrated schematically in the billing component 520 of FIG. 5) utilizes micro-payments for applications and services use on a data-charging basis (as opposed to voice telephony duration charging). The common service platform (CSP) according to the invention generates charging information between third party service providers and telecommunications carriers. A billing record is generated, filtered by a mediation device to add any desired adjustments, and then transmitted for an accounting in payment settlement. A dynamically configurable matrix provides different pricing or revenue-sharing arrangements as desired. The popularity of certain applications and services can be measured by its service access history (the hit rate). A critical marketing factor for services and applications is their position on the display menu of a terminal device (e.g., mobile phone). The invention advantageously provides dynamic menu generation based on the hit rate. That is, the more times an end user accesses a given service, the higher up on the display menu the item will appear, where convenience and ease of use are advantageously achieved for the end user as well as marketing advantages are afforded to the service providers. If a service provider desires to pay for higher menu visibility, the invention can provide such menu visibility using a dynamically configurable matrix for display menu entry, where catalogues of services can also be provided.

Figure 8:
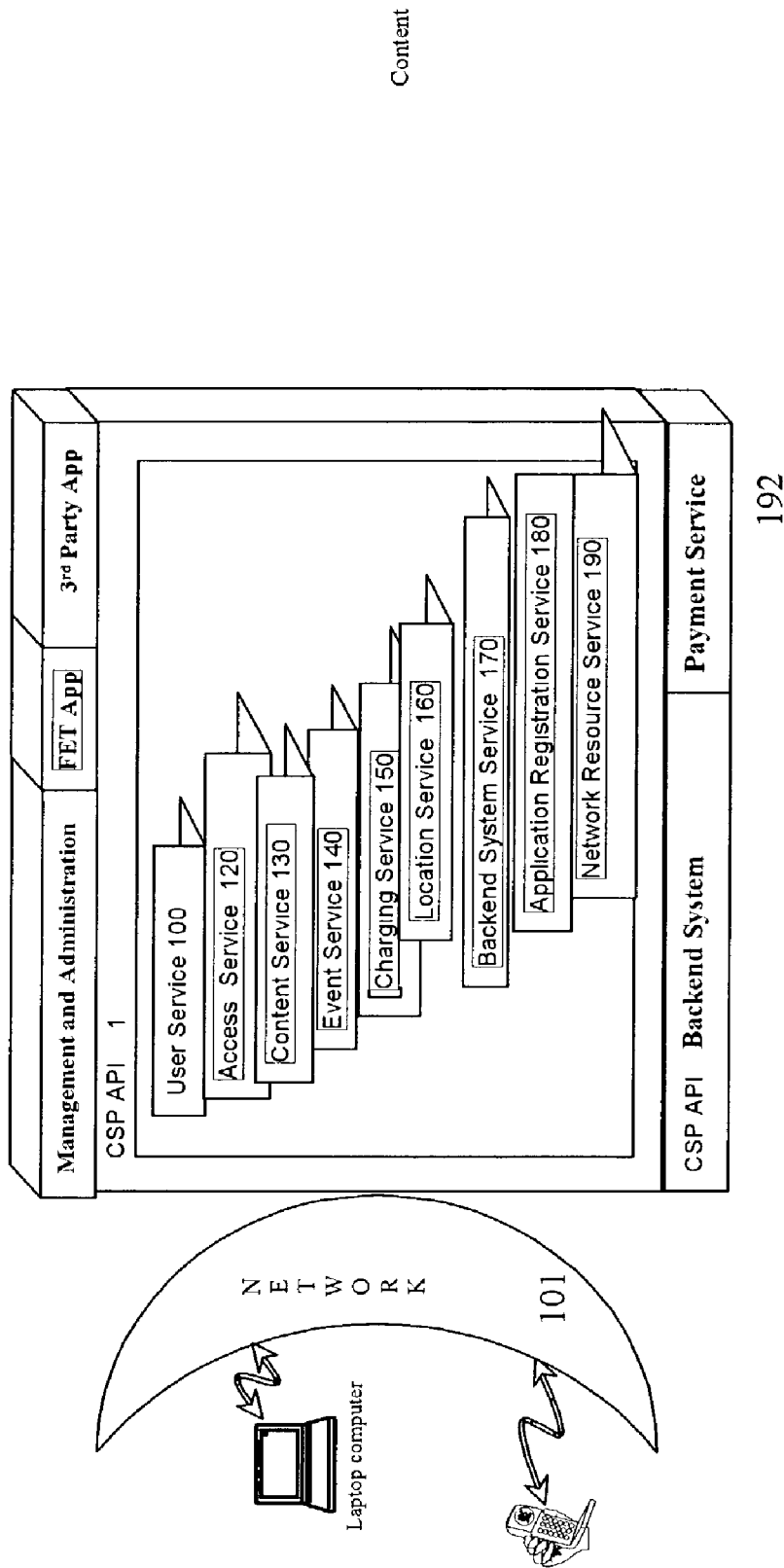
FIG. 8 is a block diagram that schematically illustrates an exemplary plurality of services supported by a common service platform (CSP) according to another preferred embodiment of the invention.

FIG. 8 is a block diagram that schematically illustrates an exemplary plurality of services supported by a common service platform (CSP) according to another preferred embodiment of the invention. The CSP according to the invention advantageously provides applications independently operable from the access device at an end user, content in varied formats and the underlying communications network. As an application program interface (API), the CSP according to the invention advantageously provides a standardized manner in enabling the interaction between applications, access devices at the end users, content channels and formats, and communications network. Operatively, the applications will not be part of the CSP, while using the services provided by the CSP. The CSP services according to a preferred embodiment of the invention primarily comprise user service 100, location service 160, content service 130, access service 120, application registration service 180, charging service 150, event service 140, backend system service 170, system management and administration service 191, and payment service 192.

The user service 100 according to this preferred embodiment of the invention, through the CSP API, provides applications with information about the end users. This user service 100 advantageously enables applications to obtain a unique user identifier and associated information needed for end-user personalization. A user profile enables identification and authentication of end users. Administration of the user profiles will be performed through the system management and administration service 191, which is described hereinafter in further detail.

The location service 160 according to this preferred embodiment of the invention, through the CSP API, provides applications with location information about the end user device. The location information will include network and geographic position, while supporting location-dependent applications. For fixed networks in general, no or little geographic information is available other than from the subscriber database. The location service 160 is applicable to scenarios where end users freely roam between different mobile networks as well as Internet protocol or IP-based telephony services (e.g., voice over IP or VoIP).

The content service 130 according to this preferred embodiment of the invention, through the CSP API, provides applications the ability to request content in different formats from a plurality of content providers. Information about content providers will be stored in a profile, including properties about the content provider such as session key information.

The access service 120 according to this preferred embodiment of the invention provides application developers independent operability from the particularized end user access methodology, which depends on the type of user access device such as GSM, PC or PDA. The physical access devices and associated access technology are abstracted through the CSP API and device driver. The content presented in the user devices is modified depending on user preferences using relevant style sheet. A device profile is maintained, including information about the device types. The device information will be updated by the system management and administration service 191, which is described hereinafter in further detail. The access service will further provide setup, maintenance and release functionalities between end users and applications.

The application registration service 180 according to this preferred embodiment of the invention application developers and third party service providers the ability to register an application and make it available for user subscription. An application profile is maintained, acting as an information nexus for applications. The application profile will include, e.g., application identifiers, security registers and categories. The system management and administration service 191 can be used in updating the application profile. The application registration service 180 is readily available for end users subscribing to internal applications, third party applications, or third party application providers subscribing to application components or library functions supplied by the common service platform (CSP). The application registration service 180 will likewise support transmission of information to the applications, and charging services (such as charging service 150, hereinafter described in further detail) by providing corresponding charging rates for applications.

Supported by the common service platform or CSP, the charging service 150 according to this preferred embodiment of the invention charges end users for using applications. The CSP will support application creation based on existing applications. The CSP also supports charging application developers for using existing applications or components in creating new applications.

For charging developers for existing applications, the application developers pay for the right to use their applications. One-time charge is available as part of an intellectual property or know how or technology transfer between application developers. The CSP can likewise support the charging of application developers for using existing applications in creating new applications.

Another charging option for the charging service 150 is revenue sharing among application developers. For instance, an end user is charged for using an application, which in turn is built by using other applications. The charging records produced by the CSP will include, in detail, all applications that are invoked in a session. A post processing system accordingly produces the bills for the end users, and calculates revenue distribution among application developers.

In addition, the applications can request the CSP to generate and log charging detail records or CDRs. The CDRs will include application and end user identification, date and time, item identification, quantity and associated information needed for billing and accounting. An event service 140, hereinafter described in further detail, will enable the applications to define the corresponding requirements in capturing and providing application inquiries. The charging service 150 can also utilize the backend system API in sending CDRs to either billing or mediator devices that collect GSM CDRs. Moreover, the charging service 150 can support charging for prepaid and postpaid usage for end users. An end user is not necessarily a user subscriber to the GSM network, as the CSP according to the invention supports separation of GSM subscription from subscriptions to applications supported by the CSP.

The CSP services according to this preferred embodiment of the invention further comprise an event service 140. An event is an occurrence, something that happens. A simple event can be, e.g., an end-user accessing an application to buy movie tickets. A more complex event can be defined as combination of a number of simple events. Triggers are events that cause specified response(s) from the system either immediately or at a predetermined time. Such a response can be as simple as creating an event log, or as complex as invoking one or more applications. Triggers can be of two types, namely time critical and non-time critical triggers. While time-critical triggers are handled as part of an application process, non-time critical triggers are generally processed off-line. Given that the limited processing power available to the CSP, off-line processing of non-time critical triggers optimally yields much better application performance (e.g., in terms of response time) than online processing of the triggers.

An event such as a system failure report is treated as a time critical trigger that immediately activates the associated specified response(s), such as invoking diagnostic programs, or alerting the system administrators. The event service 140 advantageously allows the applications to define simple events to be monitored, and specify what information will be logged when the defined events happen. Through the utilization of the events, the CSP event service allows applications to define triggers and associate specified actions with the triggers. The CSP according to the invention will also provide the ability to publish an event, where a publisher is an entity that generates an event notification message. The CSP will also provide the ability for an entity to subscribe to an event, where a subscriber is an entity that registers interest for a particular event with an event distributor who can accordingly notify the end users or subscribers.

The network resource service 190 according to this preferred embodiment of the invention provides call processing capabilities of the network as viewed from a CSP-based application. The network resource service 190 is capable of establishing, maintaining, modifying and releasing calls between specified parties. A party in a call can be an end user or a network device such as announcement devices. Additional features can also be included in the network resource service 190 for acting in an agent role on behalf of a party. Applications acting as an agent for a party are capable of modifying the processing of calls initiated by call parties, initiating calls between call parties or representing the interests of another party not directly involved in the call. The network resource service 190 will allow the CSP to interrogate network entities such as home location registers (HLRs), visitor location registers (VLRs) or message service center (MSC) in retrieving information needed for operating the same.

Through the backend system service 170 according to this preferred embodiment of the invention, the common service platform or CSP interacts with existing and future business systems (e.g., customer care or billing systems) as well as external systems. Through the backend system service 170, charging information as produced by the CSP will be output to the billing system for further processing. For prepaid end users, the billing system will use an interface to inform the CSP the remaining credits for the respective end users. The CSP can accordingly determine whether to grant an end user's request to use an application, suspend or release an ongoing session. Charging information can also be directly output to external systems for billing settlement. Through interaction with customer care systems, provisioning of CSP-based applications (including those for creating, modifying and deleting end user subscriptions to applications) can advantageously be performed through a single interface.

The system management and administration service 191 according to this preferred embodiment of the invention provides operation and maintenance support to the CSP itself and applications run by the CSP, such as performance management, fault management, configuration management and security management. Moreover, the system management and administration service 191 advantageously provides an interface allowing operation and management information to be forwarded to a central management system in the form of an alert or notification.

The payment service 192 according to this preferred embodiment of the invention allows end users to pay for using application services by credit card or debit card. The common service platform or CSP according to the invention may or may not serve as a financial clearing house, where an acquiring bank or financial institution acts as the payment partner therefor. The payment partner will be responsible for payment transactions between collaborating banks, financial institutions and credit card clearing houses. A CSP payment interface will enable an end user to enter card details through the running application. For instance, for an Internet user who purchases products or agrees to pay for services on a website, the participating e-commerce merchant can redirect the end user's browser to the CSP payment interface for entering credit card details. The end-to-end security will need to be jointly implemented with the payment partner (i.e., an acquiring bank or financial institution). At the minimum, payment data from applications to payment services will be protected by encryption with shared decrypting keys. All payment requests and results will accordingly be logged in the CSP. The payment service 192 will also provide management functions for managing merchant records, reporting of payment transactions, data mining and call center operation.

Figure 9:
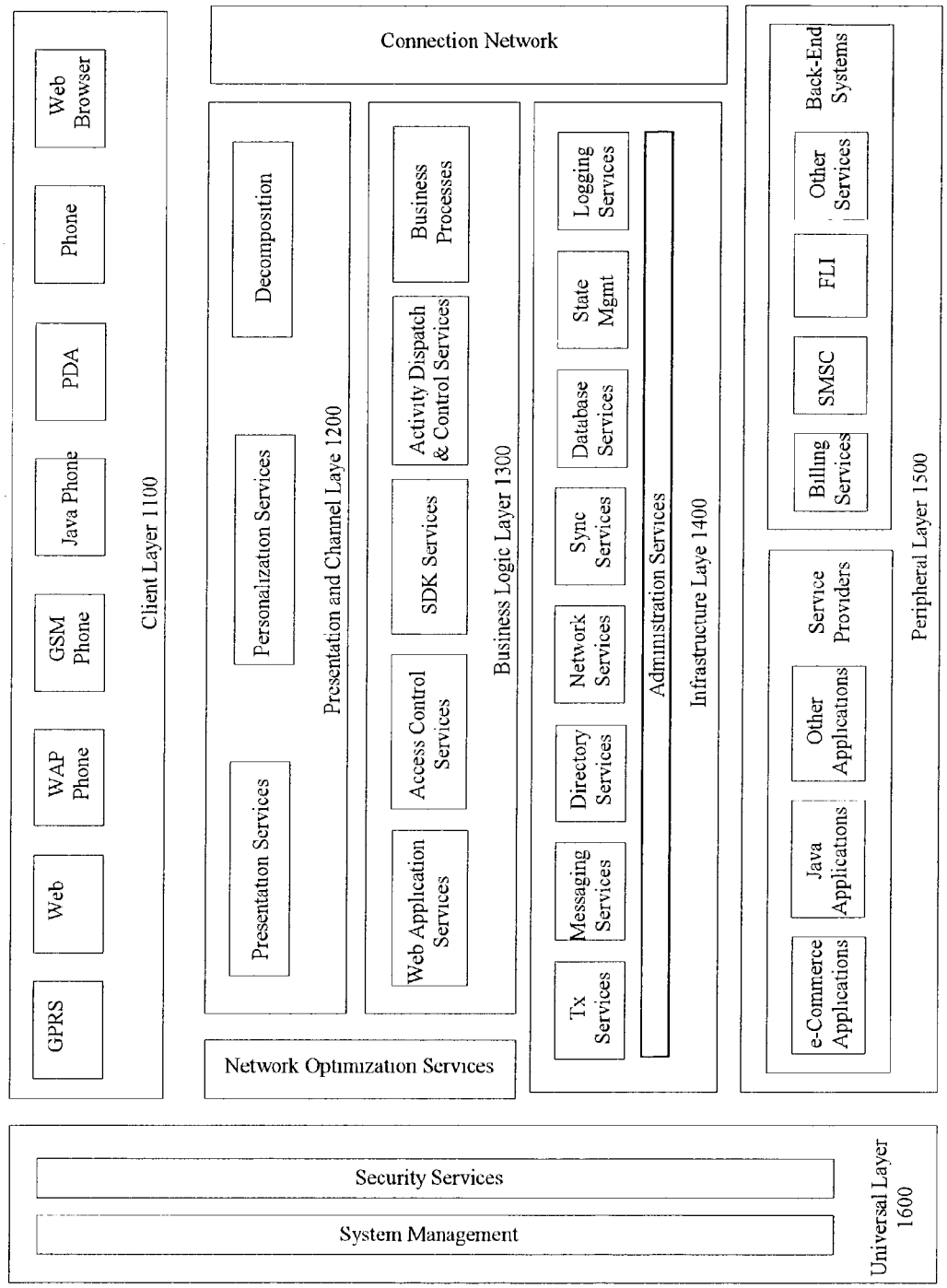
FIG. 9 is a block diagram schematically illustrating an exemplary software architecture of a common service platform (CSP) according to yet another preferred embodiment of the invention.

FIG. 9 is a block diagram that schematically illustrates an exemplary software architecture of a common service platform (CSP) according to yet another preferred embodiment of the invention. The CSP software architecture according to this preferred embodiment of the invention primarily comprises a plurality of layers, including client layer 1100, presentation and channel layer 1200, business logic layer 1300, infrastructure layer 1400, peripheral layer 1500 and universal layer 1600.

The client layer 1100 according to this preferred embodiment of the invention comprises a plurality of client devices, which end users use in accessing CSP services. Exemplary client devices include landline telephones, GSM mobile phones, GPRS telephones, WAP telephones, Java phone, personal computers (PCs) with web browsers, Internet servers, or personal digital assistant (PDAs) with wireless connections.

The presentation and channel layer 1200 according to this preferred embodiment of the invention primarily comprises presentation services and channel services. Presentation services for the presentation and channel layer 1200 will require a hypertext transfer protocol (HTTP) web server for web service provision. An exemplary HTTP web server for the presentation and channel layer 1200 will support HTTP requests from clients, manage, collate and service hypertext markup language (HTML) web pages (including static or dynamic content) for the requesting clients, and support mechanisms for locating and invoking server processing and business logic processing through common gateway interface (CGI) scripts or Java servlets. A servlet is an application designed to run on a server in the womb of a permanently resident CGI mother program written in Java that provides services for it. The exemplary HTTP web server for the presentation and channel layer 1200 can further support secure sockets layer or SSL security, provide web server extensions to enable support for application servers, manage and serve different content for a plurality of client requests. SSL is a protocol used for communicating over an encrypted connection, and for authenticating none, one or both of the participants in that connection. SSL allows session keys to be exchanged in encrypting traffic following the transmission of public keys from a website to an end user's browser, where no a priori secret password or private key is needed (even though a login process is optionally available).

Heterogeneous support of mobile devices is further included in a web environment capable of delivering content to a variety of platforms. For such a web environment, web services will include capabilities allowing multiple servers to asynchronously work on a single request in a generally simultaneous manner. Wed standards supported by such web services will include wireless markup language (WML), hypertext transfer protocol (HTTP), hypertext markup language (HTML) or secure sockets layer (SSL).

Personalization services will maintain and provide information for different users. Profile services can also be extended to provide services for holding permissible client preferences. Web page presentation for different end users or client devices can accordingly be generated based on the personalization information.

For data composition and decomposition, business logic is utilized, such as business logic layer 1300. Data generated by business logic components, as the core requirement and component for services, are composed or decomposed by the common service platform or CSP according to the invention. For web application services, an application server is a key enabler of services provided by e-business applications. Even though an application server is generally integrated into the web environment, it is web protocol independent, which can be integrated into other technologies and channel protocols. The application server provides an environment for the applications to execute and enhance the application programming environment, particularly for web-based e-business applications.

For the business logic layer 1300, there will be business processes that incorporate actual business logic. The business processes according to the invention primarily comprise service management, customer management and device management. The business logic layer 1300 further comprises access control services, which account for user authentication, resource access authorization and control, process authorization and control, whose access control rules and policies are dependent on business needs. The business logic layer 1300 further comprises activity dispatch and control services that determine which activity to conduct and which process to invoke when accepting client requests.

The infrastructure layer 1400 according to this preferred embodiment of the invention primarily comprises administration services, network services, transaction services, messaging services, directory services, synchronization services, database services, state management and log services (hereinafter described in further detail).

Administration services for the infrastructure layer 1400 regularly maintain and administer components, which define the required functionalities, in the common service platform or CSP according to the invention. The administration services for the infrastructure layer 1400 entail services including third party application administration, platform configuration and fine tuning, log file maintenance and archiving, and general monitoring and housekeeping functionalities.

Network services for the infrastructure layer 1400 are established for deployment of e-business infrastructures based on exemplary network protocols such as transmission control protocol/Internet protocol or TCP/IP. TCP/IP is a protocol piggybacked on top of IP that the Internet uses to transfer data packets. TCP/IP, on which other special-purpose Internet protocols can be further piggybacked, allows transmission of bi-directional, generally error-free, continuous binary data streams, as well as interleaving of a plurality of data streams in the same connection.

Transaction services for the infrastructure layer 1400 provide the common service platform (CSP) according to the invention with the capability to handle transaction processes. In particular, the transaction services can log, propagate and verify results for each transaction in the CSP.

Messaging services for the infrastructure layer 1400 allow an application to send messages to other applications, or receive messages from other applications. The messaging services for the infrastructure layer 1400 further provide a queuing mechanism that can reliably hold messages should partnering applications be unavailable. Applications can select a specific level of service quality for message delivery that the messaging services will deliver. The messaging services will deliver each message once and only once, even in the event of system or network failures, should an application requires. A plurality of message types is available, including, e.g., application-defined requests or events, text messages, Java objects, or extensible markup language (XML) documents.

Directory services for the infrastructure layer 1400 manage a system-wide directory and naming service that maintains information about characteristics of potential resources or entities in the system including, e.g., services, end users, data stores or applications. The directory services maintain characteristics about each resource, which generally includes information such as names, location and attributes. The directory services also serve as a critical component in managing the information regarding customer databases, storing information such as user profiles, authentication data and personalization information.

Synchronization services for the infrastructure layer 1400 are used to synchronize data among multiple repositories. For instance, user profile information are kept in various places including personalization databases, authentication or authorization databases. The synchronization services ensure consistency among the different repositories.

Database services for the infrastructure layer 1400 are responsible for processing and managing data within a number of database systems. Should the common service platform or CSP according to the invention include a relational database management system/or RDBMS, the database services for the infrastructure layer 1400 provide the facilities for managing operational data in supporting business transactions and accessing business systems data for intelligent decision-making.

State management services for the infrastructure layer 1400, or connection and session management, support a seamless and persistent connection across a plurality of disconnected events and transactions. State management services recognize the source over multiple independent connections on a wide timescale.

Log services for the infrastructure layer 1400 are used in producing various kinds of logs including system logs, application logs, billing logs, and auditing logs. These logs are further processed or analyzed by data warehouse systems, system administration tools and billing systems in providing more valuable information to enterprises. Network devices, operating systems, applications and middleware produce their own logs. Post processing is also available in managing the logs. Data aggregation includes text-to-database conversion, format translation, and tracking index setup.

The peripheral layer 1500 according to this preferred embodiment of the invention primarily comprises third party systems and backend systems.

Third party systems are partnering systems that are part of the overall, integrated common service platform or CSP. Third party applications deliver enhanced services, content and products to end users. The third party applications access the CSP according to the invention through a software development kit or SDK. Services of the third party applications are also available through other standard access formats in addition to SDK access.

Backend systems (or legacy systems) in the peripheral layer 1500 are commonly linked to frontend web applications. The backend systems may currently be running on a variety of existing architectures and systems. The backend systems are integrated with the CSP according to the invention in a various manners according to the requirements. For integrating third party applications, the CSP is the primary means of integration for the backend systems.

The universal layer 1600 according to this preferred embodiment of the invention primarily comprises security services including three primary parts, namely, network and system security, application security, and operational security. The network and system security of the security services in the universal layer 1600 serves as the base security for the system and networking components. The application security of the security services in the universal layer 1600 ensures security of the base application packages, their configuration and development of application code. The operational security of the security services in the universal layer 1600 ensures security of the ongoing operation.

The system management component for the common service platform or CSP according to the invention further defines the structure and services in integrating the management functions across the layers of the application stack. The system management component for the CSP according to the invention primarily comprises management agents, management framework, management applications, and management console, which are hereinafter described in further detail.

The management agents for system management of the CSP according to the invention monitor and control resources used by an e-business application, which generally run on the same machine for the resources they manage. The management agents respond to specific requests from management applications and collect management information about the resources. Managed resources and their agents exist at each layer of the application stack.

The management framework for system management of the CSP according to the invention supports communications between management agents and management applications. The management framework for system management in the CSP further provides a storage mechanism for collecting management information, and supports a mechanism in applying policies and procedures to the management environment.

The management applications for system management of the CSP according to the invention analyze data collected from the management agents and initiate commands to agents for problem resolution. Management applications focus on a particular function (such as a software distribution application), as well as management aspects of a particular resource (such as a database management application).

The management console for system management in the CSP provides a consolidated, central view of resources and managed applications. The system management component for the CSP infrastructure according to the invention is built on and integrated with existing and third party system management structures. Connection networks linking the CSP components and related parties include, but not limited to, GSM, GPRS/GSM, PSTN, intranet and the Internet.

The common service platform or CSP according to the invention further comprises components in their respective hierarchies in terms of their respective responsibilities, static relationships, and the manner by which they collaborate with each other in delivering the required functionalities. A component is a relatively independent part of a system, which is characterized by its responsibilities and by the interfaces it offers. Each component has corresponding responsibilities, required service levels, design rationale and implementation approach. Repository components are responsible for ensuring persistence of data and providing data management functions such as create, delete, modify, or retrieve (including retrieve based on a key, and retrieve based on selection criteria).

Availability of the CSP system according to the invention is dependent on the needs of end users. The availability expectations of the CSP system relate to how many hours per day, days per week, and weeks per year the CSP application will be available to end users and how quickly it is able to recover from failures. Some of the system functionalities may be used intermittently during certain parts of the day, week, month, or year. CSP functions will be readily available should the needs of the end users become mission critical. The usage pattern and expectations of the CSP functionalities as a whole yield the corresponding availability requirements for the CSP system. For reliability, the CSP applications according to the invention, with corresponding architecture and infrastructure in predictably and reliably delivering functionalities therefor, generally produce the same results consistently under different operating conditions.

Security requirements are needed to ensure the CSP system's ability to safeguard data against loss, negative exposure or external disruption. For data sensitivity in the CSP, a plurality of sensitivity levels is applied with respect to the CSP system, end users and third party providers. Data sensitivity can be categorized into at least two levels, namely, sensitive and not sensitive. For data that are not sensitive, e.g., public content such as customer menu, service catalog, news and weather, no data encryption is required. For data that are sensitive, e.g., organizational information, sales data, billing data, invoice data, authentication and credit card information, data are encrypted for transmission over public networks. Regardless of data sensitivity, all data access will be controlled by existing authentication and authorization procedures for end users.

For authentication, a user ID or password (such as one having a minimum length) will be required for authenticating Internet end users for accessing the common service platform or CSP according to the invention. Subscriber identity module or SIM cards are used for authenticating mobile CSP users. A session expiration or timeout after a certain time period is also available. For access control, the CSP system according to the invention allows administration of access rules within a plurality of applications, and supports multiple user classes or groups, each having access to different functionalities and data. The CSP system can further include the capability to customize access for each user, e.g., by overriding the group access protocols. For network administration, the CSP according to the invention utilizes the concept of data zones for its systems. Exemplary data zones includes a red zones where systems are completely untrusted, such as any system on external networks, a yellow zone having somewhat trusted systems generally including systems that communicate externally, and a green zone having trusted systems generally including internal core-business systems. Firewalls stand on zone boundaries. No persistent application data (as identified in terms of data sensitivity) will be stored on yellow or red zone systems, except session data. There are generally no connections between red and green zone systems. Firewall rules ensure that only authorized yellow zone hosts can contact green zone hosts.

Non-repudiation is the capability to capture irrefutable evidence that an end user performed a transaction as the system received the transaction. The common service platform or CSP according to the invention utilizes user ID, password, and SIM cards in identifying the end users. The CSP further maintains usage event log as the user transaction is being performed, where full audit logging is allowed for security events such as failed login, password reset, user ID creation and registration.

The CSP architecture according to the invention facilitates the establishment of a systematic and thorough maintenance and administration program therefor. The CSP architecture includes components that allow for the proactive management of both the systems infrastructure and the applications that execute on that infrastructure. Systems management components are defined in allowing for the effective, centralized management of hardware, systems software and middleware, as well as applications. For system management, requirements are needed for maintaining and administrating the CSP software and hardware systems. System management generally involves activities such as adding and removing end users and privileges, monitoring the CSP system, tuning infrastructure and application components, updating application components in meeting changing business requirements (e.g., adding new functions and changing data formats), fixing bugs and adapting the software to new hardware devices, distributing and updating of application and data files, providing hardware and software diagnostics or repairs.

Event management optimizes customer service by generating, gathering, and analyzing events throughout the common service platform or CSP according to the invention to proactively identify and resolve conditions leading to potential problems. CSP applications produce a time stamp log with different levels of severity in reporting such events as, e.g., connectivity failures, message flow problems, application failures, or operations exceeding maximum response time. Integrated applications monitoring will be required in reporting to the management system for the CSP. There are at least four levels in monitoring CSP system resources, as follows:

| Level | Resources | Remarks |
| --- | --- | --- |
| Operating system level | System (e.g., AIX) error log, central processing unit or CPU, memory, input/output or I/O, auditing events, file system free space, paging space, network traffic. | This monitoring level focuses at the operating system or OS level, primarily on hardware and system resources. |
| Subsystem level | Processes and error events (e.g., error log) for CSP component subsystems. | This monitoring level focuses on CSP software component subsystems. |
| Application level | System-related events from CSP applications. | The CSP applications are able to write system-related events to flat files for readily available event collection and monitoring. This monitoring level primarily focuses on system events occurring in user transactions. |
| Network level | Network topology and events, or network availability status. | This monitoring level focuses on the network for network management. |

For every resource being monitored, there is a corresponding threshold and severity, including severity levels corresponding to real-time alert mechanisms to alert operators or system administrators, as follows:

| Severity level | Severity | Conditions |
| --- | --- | --- |
| Fatal | 1 | Resource is operationally malfunctional or on its way to full-scale malfunction, which is considered to be unrecoverable. Large numbers of end users are affected and cannot perform their tasks. |
| Critical | 2 | Resource has achieved the threshold level for criticality as defined by the resource owner. The situation is recoverable if there is an immediate response. Failure of a device will be avoided if a redundant function is available. User work is impacted but not stopped. |
| Warning | 3 | Resource value deviates from normal operation, but no imminent failure is expected. Customer work is not affected. |

-continued

| Severity level | Severity | Conditions |
|---|---|---|
| Harmless | 4 | Conditions include informational events such as confirmation of a successful event completion, or resolution of previous event or device status (i.e., device up). |

Subsystems status monitoring for the CSP involves the monitoring of the working status of CSP-related subsystems. A mechanism in the CSP is available for operators and system administrators to check subsystem status using a network ping or service ping in real time.

For change management, changes are introduced into the CSP environment in minimizing disruption to that environment, including, e.g., staging and accepting content changes. CSP content changes are allowed generally without downtime., where application changes are coordinated among applications and rollback of application changes are supported.

For configuration management, configuration information are identified in maintaining and establishing the information management system, collecting the configuration information, populating the database, and making the information available to other processes in the CSP environment. The CSP application code utilizes a configuration management tool in handling version control.

For availability, backup and recovery management, appropriate procedures and necessary data are in place and ensured to be readily available for reestablishing CSP systems and data in the event of a failure. The persistent data in the CSP are backed up on a periodic basis (e.g., daily), without requiring downtime for backing up CSP applications. Redundant backup (e.g., weekly) can also be performed for a more comprehensive backup. CSP systems support backup methods such as backup using local tape drives in each server or system image backup or low volume data backup using existing backup solutions.

For performance and capacity management, the measurement, analysis, monitoring, modeling, and periodic fine-tuning of components are performed in meeting performance and capacity requirements in the CSP, where web statistics, peaks and trends are analyzed in anticipating issues.

For balance configuration, the design of the CSP architecture takes into consideration factors such as optimal availability and load balance. The load balancing component is a server that is able to dynamically monitor and balance transmission control protocol or TCP servers and applications in real time. The load balancing component, which is utilized in all CSP component subsystems having web interfaces, allows heavily accessed web sites to increase capacity, since multiple TCP servers can be dynamically linked in a single entity that appears in the network as a single logical server. One side effect of this load balancing is that it not only can increase network scalability but also improve availability and reliability of the web servers. In the event of a failure of one web server, all requests are directed to and distributed over the remaining servers. The network dispatcher itself provides a cluster mechanism where a standby network dispatcher takes over dispatching functions when the primary network dispatcher fails.

The invention, including at least the preferred and other embodiments described herein, accordingly provides an optimal architecture for mobile common service platform and software in telecommunications systems that advantageously overcomes at least the aforementioned and other shortcomings in the art, and more particularly, a telecommunications system that advantageously promotes standardized, open connectivity for service and applications providers in attracting and facilitating providers so that services will attract users. The invention advantageously provides seamless integration of access methods using multiple types of devices and content hosts, i.e., convergence of mobile Internet applications, in providing a comprehensive information and service environment for users. According to the invention, terminal devices, and particularly mobile phones, are advantageously provided with efficient and ready access to services and applications through the Internet and other networks, where mobile commerce ("m-commerce") is optimally achieved and realized. The virtuous cycle of a large installed base of users attracting applications providers with the number of users increasing because of the new applications is advantageously realized as well, where the convenience and efficiency of providing those applications to users are optimally implemented in accordance with the invention.

With at least the embodied common service platform and software described herein, service provider can quickly and easily create and host applications for users, where terminal device abstraction is advantageously achieved so that applications only need to be created once advantageously without redundant and inefficient duplication of creative effort. The invention advantageously and optimally provides standardized access to users to common services and resources. Moreover, a plurality of access technologies are readily available to users, who are transparent to the underlying network infrastructure, equipment and devices and other capabilities in optimally acquiring efficient application development. The invention further provides a service platform that advantageously enables efficient addition of new services, access methods and terminal devices, where a reliable, high-performance and scalable architecture is advantageously provided as well.

It would be apparent to one skilled in the art that the invention can be embodied in various ways and implemented in many variations. For instance, a network of computers is described herein in illustrating various embodiments of the invention. The invention is accordingly applicable in this and other types of networks, such as a metropolitan area network (MAN), a wide area network (WAN), a local area network (LAN) or even wireless communications networks for mobile phones and personal digital assistant (PDA) devices. Such variations are not to be regarded as a departure from the spirit and scope of the invention. In particular, the process steps of the method according to the invention will include methods having substantially the same process steps as the method of the invention to achieve substantially the same results. Substitutions and modifications have been suggested in the foregoing Detailed Description, and others will occur to one of ordinary skill in the art. All such modifications as would be obvious to one skilled in the art are intended to be included within the scope of the following claims and their equivalents.

I claim:

1. A common service platform (CSP) system comprising:
 a telecommunications network;
 a common service platform (CSP) communicable with a plurality of applications and a plurality of end users through said telecommunications network;
 a plurality of user requests from said end users to said common service platform (CSP);

a gateway communicable with said end users and said telecommunications network and converting protocols therebetween;

a plurality of converters converting content formats into a same format acceptable by one selected application out of said applications in response to said user requests;

a service network;

a plurality of application service providers (ASPs) communicable with said service network;

a core network further comprising a plurality of home location registers (HLRs) and visitor location registers (VLRs); and an access network communicable with said core network;

wherein data are output from said selected application in a transferred format acceptable to said end users.

2. The system of claim 1 wherein said applications further comprise at least one application program interface (API) common to all of said end users.

3. The system of claim 1 wherein said access network is communicable with a network further comprising the Internet, public switched telephone network (PSTN), integrated services digital network (ISDN), global system for mobile communications (GSM) and universal mobile telecommunications system (UMTS).

4. The system of claim 1, said service network further comprising a services/application layer communicable with said core network, which serves as a platform for Internet protocol (IP) applications.

5. The system of claim 1, said core network further comprising:

a control layer providing call control, session management and mobility management for terminal devices; and a connectivity layer handling user data.

6. The system of claim 5, said user data further comprising transport, switching and routing data.

7. The system of claim 1, wherein said common service platform (CSP) is communicable with a plurality of user terminal devices comprising mobile phones, personal digital assistants (PDAs), pagers, handheld computers, palmtop computers, pocket computers, and notebook computers.

8. The system of claim 1 further comprising:

a backend system communicable with said common service platform (CSP);

a standardized platform; and a plurality of application service provider (ASP) servers interfacing with said standardized platform and said backend system.

9. The system of claim 1, said common service platform (CSP) providing device abstraction for a plurality of terminal devices wherein all of said terminal devices are treated as an abstract entity in hiding complexities of said core network and said access network from said application service providers.

10. The system of claim 9, said common service platform (CSP) providing unified application programming interfaces for network resources and backend systems.

11. The system of claim 1, said applications further comprising user service, location service, content service, access service, application registration service, charging service, event service, payment service, backend system service, system management and administration service.

12. The system of claim 11, said user service further comprising user profiles for said end users for end user identification, personalization and authentication.

13. The system of claim 11, said location service further comprising location information for devices of said end users.

14. The system of claim 13 wherein said system management and administration service administers said user profiles.

15. The system of claim 11, said location service further comprising location information supporting location-dependent applications for different mobile networks and Internet protocol (IP)-based telephony.

16. The system of claim 11, said content service storing information about a plurality of content providers.

17. The system of claim 11, said access service providing developer access for application developers independent from access by said end users.

18. The system of claim 11, said access service providing setup, maintenance and release of communications between said end users and said applications.

19. The system of claim 11, said application registration service supporting said charging service by providing charging rates of said applications.

20. The system of claim 11, said charging service supporting revenue sharing among a plurality of application developers for said applications wherein a post processing system respectively bills said end users.

21. The system of claim 11, said charging service generating and logging charging details.

22. The system of claim 11, said event service further comprising:

a plurality of simple events;

a plurality of complex events as combinations of a number of said simple events; and a plurality of triggers causing specified responses from said system.

23. The system of claim 22, said triggers further comprising time-critical triggers and non-time-critical triggers.

24. The system of claim 11, through said event service, said applications defining a plurality of simple events and specifying information to be logged when said defined events occur.

25. The system of claim 11, through said event service, said applications defining a plurality of triggers and actions respectively associated with said triggers.

26. The system of claim 11, said system management and administration service further supporting performance management, fault management, configuration management, and security management.

27. The system of claim 11, said payment service further managing merchant records, reporting payment transactions, managing data mining and call center operations.

28. The system of claim 1 further comprising a network resource service providing call processing capabilities in said system.

29. The system of claim 1 further comprising a plurality of severity levels including a fatal level, a critical level, a warning level, and a harmless level.

* * * * *